United States Patent
Bose et al.

(10) Patent No.: US 10,230,554 B2
(45) Date of Patent: *Mar. 12, 2019

(54) WIRELESS RECEIVER FOR MULTIUSER DETECTION INCORPORATING RESIDUAL ESTIMATION ERRORS

(71) Applicant: Collision Communications, Inc., Peterborough, NH (US)

(72) Inventors: Sayak Bose, Nashua, NH (US); Brandon Hombs, Merrimack, NH (US); Joseph Farkas, Merrimack, NH (US)

(73) Assignee: COLLISION COMMUNICATIONS, INC., Peterborough, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/925,599

(22) Filed: Mar. 19, 2018

(65) Prior Publication Data

US 2018/0212801 A1 Jul. 26, 2018

Related U.S. Application Data

(63) Continuation of application No. 15/375,970, filed on Dec. 12, 2016, now Pat. No. 9,923,739, which is a continuation of application No. 14/974,461, filed on Dec. 18, 2015, now Pat. No. 9,521,018.

(51) Int. Cl.
*H04L 25/03* (2006.01)
*H04L 25/02* (2006.01)
*H04B 7/0452* (2017.01)

(52) U.S. Cl.
CPC .... *H04L 25/03292* (2013.01); *H04L 25/0204* (2013.01); *H04L 25/03267* (2013.01); *H04L 25/03331* (2013.01); *H04B 7/0452* (2013.01); *H04L 25/03076* (2013.01); *H04L 2025/03636* (2013.01)

(58) Field of Classification Search
CPC ........ H04L 25/03292; H04L 25/03076; H04B 7/0452
USPC ...................................................... 375/316
See application file for complete search history.

(56) References Cited

U.S. PATENT DOCUMENTS

| 5,455,844 A | 10/1995 | Ishikawa et al. |
| 9,521,018 B1* | 12/2016 | Bose ................... H04L 25/0204 |
| 9,923,739 B2* | 3/2018 | Bose ................ H04L 25/03292 |
| 2008/0232439 A1 | 9/2008 | Weizhong |

(Continued)

*Primary Examiner* — Michael R Neff

(57) ABSTRACT

An improved receiver design implements a practical method for modeling users in SIC turbo loop multiuser detection architectures, wherein in each loop unsubtracted estimation errors from previous loops are used to appropriately scale the error covariance matrix for each user, thereby accurately representing the remaining residual interference in the data stream for each desired user. The effect of estimation errors in previous interference cancellation operations is thereby minimized, and symbol estimations in successive turbo loops are improved, for example during multiuser MMSE, multiuser MMSE with interference rejection combining (MMSE-IRC), sample matrix inversion (SMI), or any of their adaptive variants (least mean-square, recursive least square, Kalman filter etc.). The estimated residual symbol energy can be computed per symbol, and then applied to entire data streams, to groups of symbols, or to each symbol separately.

27 Claims, 3 Drawing Sheets

(56) References Cited

U.S. PATENT DOCUMENTS

2010/0095180 A1  4/2010  Sawai
2015/0139368 A1  5/2015  Abrishamkar et al.

* cited by examiner

WIRELESS RECEIVER FOR MULTIUSER DETECTION INCORPORATING RESIDUAL ESTIMATION ERRORS

RELATED APPLICATIONS

This application is a continuation of U.S. Pat. No. 9,923,739, titled, "WIRELESS RECEIVER FOR MULTIUSER DETECTION INCORPORATING RESIDUAL ESTIMATION ERRORS," filed on Dec. 12, 2016, which is a continuation of U.S. Pat. No. 9,521,018, titled "IMPROVED WIRELESS RECEIVER FOR TURBO LOOP MULTIUSER DETECTION INCORPORATING PRIOR LOOP RESIDUAL ESTIMATION ERRORS", filed on Dec. 18, 2015, the entire disclosures of which are here incorporated by reference.

FIELD

The invention relates to receivers used in telecommunications, and more particularly, to receivers that are configured for turbo loop multiuser detection in wireless telecommunication.

BACKGROUND

Multiuser detection ("MUD") is an effective approach for detecting multiple, simultaneous data streams transmitted by a plurality of frequency sources (generically referred to herein as "users") on a common frequency channel, thereby providing a significant increase in the spectral efficiency of the communication network. Applications include, but are not limited to, cellular telephone communication of voice and data to and from cellular handsets, other wireless mobile devices, and wireless base stations.

Often, it is possible during multiuser detection to accurately decode at least some of the data streams included in a received transmission, so that checksums or other accuracy verification tests are met. Nevertheless, other data streams included in the transmission typically remain that cannot be decoded with complete accuracy, due for example to noise and interference from unwanted signals. Accordingly, the data streams that cannot be accurately decoded must be approximated, or "modeled," so as to obtain a best possible estimate of the symbols transmitted in those data streams. The final result of multiuser detection is therefore typically a combination of "decoded" data streams, for which the transmitted symbols are accurately known, and "modeled" data streams, for which only best guess estimates of the transmitted symbols are known.

Several approaches have been proposed for modeling data streams in multiuser detection wireless communication networks that cannot be accurately decoded, including but not limited to minimum mean-square error ("MMSE"), zero forcing ("ZF"), maximum-likelihood detection ("MLD"), and many others. The MLD approach is optimal, but has a very high implementation complexity for even moderate numbers of undecoded users. As an alternative, linear equalization methods such as multiuser MMSE combined with interference rejection and sample matrix inversion are popular, due to their lower implementation complexity.

In particular, non-linear successive interference cancellation ("SIC") receiver architectures involving turbo loops have recently become very attractive, because they provide performance that approaches the optimal performance of MLD detection, but have much lower implementation complexity. However, these methods can suffer from accumulation of estimation errors as successive turbo loops attempt to model additional users based on the inherently faulty assumption that the users modeled in previous loops have been modeled with complete accuracy.

What is needed, therefore, is an improved receiver design for modeling users in SIC turbo loop multiuser detection architectures, while minimizing accumulation of estimation errors in successive turbo loops.

SUMMARY

An improved receiver deign implements a method for modeling users in SIC turbo loop multiuser detection architectures that is applicable to practical, "real world" communication networks that have reasonable degrees of complexity. The method minimizes estimation errors in successive turbo loops by making more effective use of "soft" information obtained by the channel demodulator or decoder in preceding turbo loops.

More specifically, the receiver takes advantage of information that is available "a-priori," i.e. at the beginning of each turbo loop, regarding the remaining symbol energy that has resulted from estimation errors in the previous turbo loop, and that remains present in the modeled data streams after the previous interference cancellation operations have been performed, for example, during multiuser MMSE, multiuser MMSE with interference rejection combining (MMSE-IRC), sample matrix inversion (SMI), or any of their adaptive variants (least mean-square, recursive least square, Kalman filter etc.).

The equalization of the individual data streams in successive turbo loops is thereby improved by using this a-priori knowledge of the remaining estimation errors from the previous loop to appropriately scale the error covariance matrix for each user, thereby accurately representing the remaining residual interference in the data stream for each desired user.

As a result, detection of transmitted data by a wireless receiving device is increased in bandwidth and speed. Applications include, but are not limited to, cellular and other wireless communications between mobile devices and base stations, whereby a device such as a cellular telephone handset or other mobile wireless device, or any other user-operated device that is in data communication with a wireless device, is caused to present received information such as voice communication, video, a graphical image, text, and/or other data to a user. Due to the increased bandwidth and speed provided by the disclosed method and apparatus, such networks are able to support larger numbers of users, and users are able to upload and download larger amounts of data in less time.

A first general aspect of the disclosed method includes receiving a transmission including a plurality of data streams from a plurality of signal sources, each data stream including a plurality of known reference symbols and a plurality of unknown data symbols; using the reference symbols to obtain a channel estimate for each of the data streams; equalizing the data streams included in the transmission according to said channel estimates; demodulating the equalized data streams; decoding the data symbols for any of the data streams that can be accurately decoded, and estimating all remaining data symbols for all remaining data streams; calculating a residual error for each of the estimated data streams; remodulating the estimated and decoded data streams; obtaining a residual transmission by removing from the received transmission all decoded data streams; for each of the estimated data streams, modeling the data stream by subtracting all of the other estimated data streams from the residual transmission; equalizing the modeled data stream according to the channel estimates and the residual errors for each of the estimated data streams that has not been accurately decoded; and repeatedly applying to the residual transmission in a loop the steps of demodulating, decoding, estimating, calculating, remodulating, obtaining a residual transmission, modeling, and equalizing until a loop termination requirement has been met.

A first general aspect of the disclosed apparatus includes a receiver unit and a signal processing unit. The receiver unit is configured to receive a plurality of data streams from a plurality of signal sources included in a received transmission, each data stream including a plurality of known reference symbols and a plurality of unknown data.

The signal processing unit is configured to use the reference symbols to obtain a channel estimate for each of the data streams; equalize the data streams included in the transmission according to said channel estimates; demodulate the equalized data streams; decode the data symbols for any of the data streams that can be accurately decoded, and estimate all remaining data symbols for all remaining data streams; compute a residual error for each of the estimated data streams; remodulate the estimated and decoded data streams; obtain a residual transmission by removing from the received transmission all decoded data streams; for each of the estimated data streams, model the data stream by subtracting all of the other estimated data streams from the residual transmission; equalize the modeled data stream according to the channel estimates and the residual errors for each of the estimated data streams that has not been accurately decoded; and repeatedly apply to the residual transmission in a loop the steps of demodulating, decoding, estimating, calculating, remodulating, obtaining a residual transmission, modeling, and equalizing until a loop termination requirement has been met.

A second general aspect of the disclosed apparatus includes a non-transitory computer readable medium storing a computer program, executable by a machine, for decoding and modeling a plurality of data streams, the computer program comprising executable instructions for receiving a transmission including a plurality of data streams from a plurality of signal sources, each data stream including a plurality of known reference symbols and a plurality of unknown data symbols; using the reference symbols to obtain a channel estimate for each of the data streams; equalizing the data streams included in the transmission according to said channel estimates; demodulating the equalized data streams; decoding the data symbols for any of the data streams that can be accurately decoded, and estimating all remaining data symbols for all remaining data streams; calculating a residual error for each of the estimated data streams; remodulating the estimated and decoded data streams; obtaining a residual transmission by removing from the received transmission all decoded data streams; for each of the estimated data streams, modeling the data stream by subtracting all of the other estimated data streams from the residual transmission; equalizing the modeled data stream according to the channel estimates and the residual errors for each of the estimated data streams that has not been accurately decoded; and repeatedly applying to the residual transmission in a loop the steps of demodulating, decoding, estimating, calculating, remodulating, obtaining a residual transmission, modeling, and equalizing until a loop termination requirement has been met.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

A novel receiver design disclosed herein implements an improved method for modeling users in SIC turbo loop multiuser detection architectures. The disclosed method minimizes estimation errors in successive turbo loops by making more effective use of "soft" information regarding estimation errors obtained by the channel demodulator or decoder in preceding turbo loops. Specifically, in addition to the estimated "soft symbols" provided by the demodulator or decoder the disclosed method also makes use of "confidence levels" that are associated with the soft symbols.

After the first stage of equalization and subsequent demodulation, it is often possible to decode some of the transmitted data streams with complete accuracy, as indicated by a checksum or similar accuracy test. So as to estimate, or "model," those data streams that cannot be accurately decoded, the contributions of the accurately decoded data streams are subtracted from the received transmission so as to obtain a "residual" transmission, based on which the demodulator output, or the channel decoder output in the case of a coded system, provides the best posterior estimate, in terms of log-likelihood ratio, of the transmitted bits contained in the estimated data streams. This posterior estimate is then used to obtain estimates of the transmitted symbols. These "soft" symbols are best guesses of the actual transmitted symbols, which cannot be known with certainty due to the presence of channel estimation and equalization errors. Additionally, estimates of the errors between the soft symbol and the actual transmitted symbols for each user are also computed, based on a minimum-mean-square error criterion.

In each successive turbo loop, a "desired" data stream is selected from among the estimated data streams in the residual transmission, and a model of the selected data stream is obtained by using the soft symbols to subtract the energy of all of the other data streams from the residual transmission, in a successive/parallel interference cancellation process.

So as to clearly elucidate the method disclosed herein, it may be helpful to first describe a similar approach that does not employ the disclosed method.

Figure 1:
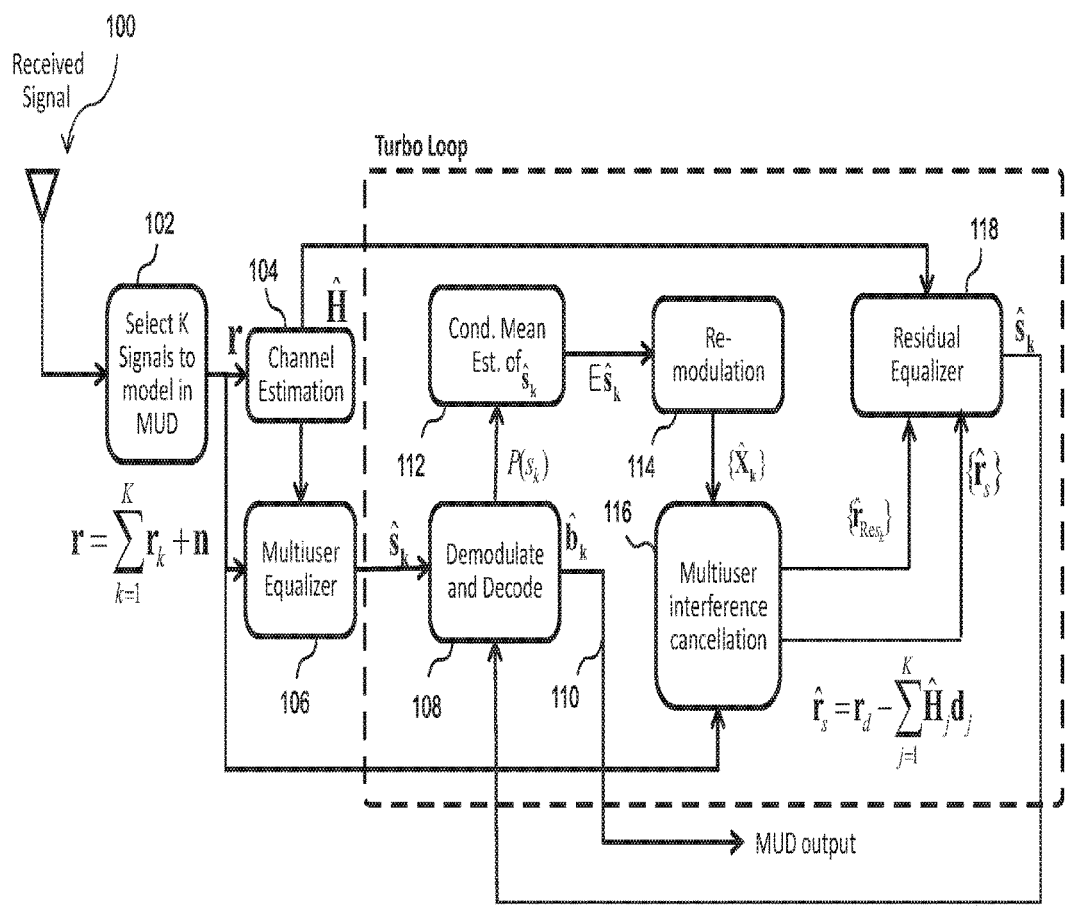
FIG. 1 is a block diagram illustrating a process for decoding and modeling a plurality of data streams that does not include the method disclosed herein.

With reference to FIG. 1, this similar approach can be summarized by the following steps. In the first turbo loop, a transmission is received 100 by at least one antenna, and a plurality of data streams are selected for decoding or modeling 102. It may be that all of the data streams in the transmission are selected, or it may be that only a subset is selected. Herein, references to "the data streams included in the received transmission" or similar language refer to those data streams in the received transmission that are "desired," i.e. selected for decoding or modeling, whether or not other data streams remain that are not selected.

Once the desired data streams have been selected 102, known reference bits in the transmission are used to obtain a channel estimate 104 for each selected data stream. The channel estimates are then used to equalize the received data 106 streams, after which they are demodulated and passed to a decoder 108. In general, there may be some data streams that can be accurately decoded in this first turbo loop, which are then treated as "outputs" 110 of the multiuser detector. For the other data streams, referred to as the "residual transmission," the transmitted bits are estimated by the decoder, and are referred to as "soft" bits.

In each turbo loop, the soft bits estimated by the decoder 108 are used to obtain conditional symbol estimates 112, referred to as "soft" symbols, for all of the data streams in the residual transmission. One by one, each of the data streams in the residual transmission is then selected to be modeled in the active loop. An estimate, or "model" of the selected data stream is obtained by remodulating 114 all of the estimated data streams, and then applying "interference cancellation" 116, whereby the contributions of the soft symbols of all of the other estimated data streams are subtracted from the residual transmission, so that only a model of the selected data stream remains.

The residual transmission is then updated 118 by subtracting the contributions of any of the newly modeled data streams that have been accurately decoded, after which the loop is repeated until all of the desired data streams have been decoded, or until a specified maximum number of loops has been completed.

The symbols used in FIG. 1 are defined as follows:
r Received signal of desired and interfering users
Ĥ Channel estimates of all desired users
$\hat{S}_k$ Equalized user symbols
$E\hat{s}_k$ Soft symbol estimates
$\hat{b}_k$ Decoded and modeled user bits
$\{X_k\}$ Re-modulated soft-symbols
$\{\hat{r}_{Res_k}\}$ Residual signal with decoded and modeled users removed
$\{\hat{r}_s\}$ Common error signal Note that according to this approach, at the beginning of each turbo loop the modeled data streams that remain in the residual transmission are equalized 118 under an inherent assumption that their symbols were estimated 112 in the previous loop with complete accuracy. Of course, this assumption is incorrect because, due to estimation errors, residual error contributions are included in each of the modeled data stream. The equalization 118 is therefore performed under a false assumption, and the quality of the subsequent demodulation and decoding 108 suffers as a result.

In general, soft symbol calculations 112 provide a pair of results for each estimated symbol, namely the best "guess" as to the symbol that was actually transmitted, and a confidence level as to the likelihood that the guess is correct. By treating the soft symbols as if they were fully accurate, the method of FIG. 1 essentially discards the confidence level information, and thereby uses only part of the information that is provided by the soft symbol calculations 112.

In contrast, the method disclosed herein provides improved results compared to the method of FIG. 1 because it does not make the erroneous assumption that symbols in the modeled data streams are accurately known. Instead, the disclosed method makes full use of the estimation results 112 by incorporating both the soft symbols and the associated confidence levels, i.e. the calculated estimation errors, in the interference cancellation process.

Of course, it is not possible to know with certainty which of the soft symbols are correct, and which are not. However, the present method uses the confidence levels provided by the soft symbol calculations 112 to determine an estimated, average error amplitude for each modeled data stream, and then incorporates these error amplitudes, referred to herein as residual errors, into the equalizations of the individual data streams in the residual transmission at the beginning of each turbo loop. In this way, each successive turbo loop takes into account the soft symbol calculation errors from the previous loop by making use of the confidence levels.

Figure 2:
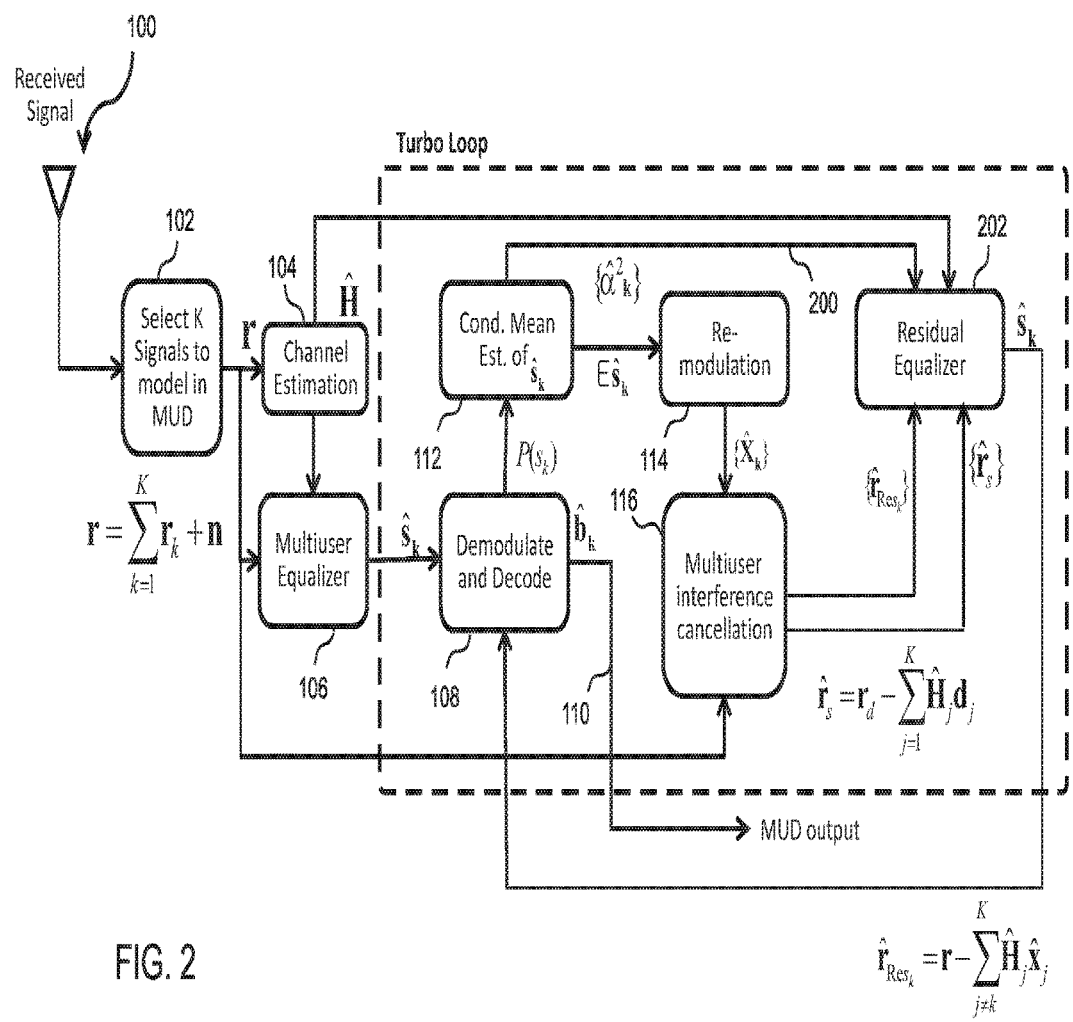
FIG. 2 is a block diagram illustrating a process similar to FIG. 1, but in which an embodiment of the method disclosed herein is included.

An exemplary embodiment of the disclosed method is illustrated in FIG. 2. It can be seen that many of the steps in FIG. 2 are identical with corresponding steps of the method illustrated by FIG. 1. However, when the "soft" symbols are estimated 112, the average errors 200 associated with these estimations are retained, and are used to improve the equalizations of the individual data streams in the residual transmission at the beginning of the next turbo loop 202. In this way, the multiuser detector does not assume perfect symbol estimations 112 and perfect cancellation of the modeled data streams during multiuser interference cancellation 116 in the previous loop, but instead uses the average error information 200 to take these errors into account by estimating the average signal amplitude of each user's re-modulated signal from the previous turboloop. This residual energy is denoted by $\hat{\alpha}^2_k$ in the figure. The turbo loop process then continues as in FIG. 1, but with improved results.

In some embodiments, an equalizer filter is computed for each data stream k according to the equation:

$$W = h^H(H\Sigma_k H^H + C_r)^{-1} \quad (1)$$

where $C_r$ is the interference rejection covariance matrix estimate of the additive white Gaussian noise and the decoded and modeled data streams (if any) in the system is given by:

$$\Sigma_k = \text{diag}(\hat{\alpha}^2_1, \ldots \hat{\alpha}^2_{k-1}, 1, \hat{\alpha}^2_{k+1}, \ldots, \hat{\alpha}^2_K) \quad (2)$$

In various embodiments, each desired users' residual energy $\hat{\alpha}^2_k$ is estimated from the soft symbol estimates of the previous turbo loop as:

$$\hat{\alpha}^2_k = E\left[\sum_{s_i \in S}(\hat{s}_i - s_i)^2 P(s_i)\right] \quad (3)$$

where E denotes the expectation operation, S is the constellation of points for the desired user's modulation, $s_i$ are the symbols in the transmitted constellation symbol set, and $\hat{s}_i$ are the estimated "soft" symbols.

In addition to the symbol definitions given above for FIG. 1, note that in FIG. 2, and in the equations above, $\hat{\alpha}^2_k$ is defined as the estimate from the previous turbo loop of the remaining signal energy per user.

Depending on the embodiment, the estimated symbol energy remaining due to estimation errors in the modeled data streams can be explicitly computed per symbol, and then applied to entire data streams, to groups of symbols, or separately to each symbol.

Figure 3:
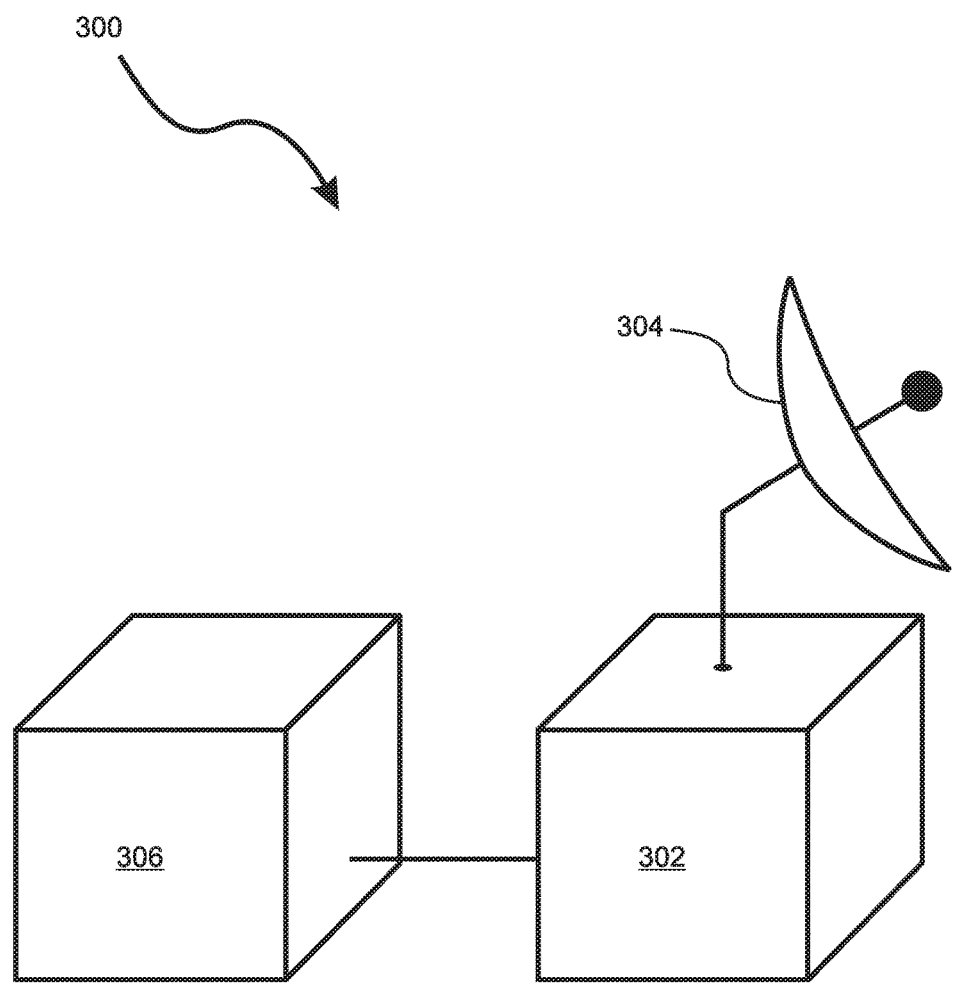
FIG. 3 is a block diagram illustrating an embodiment of the disclosed system.

With reference to FIG. 3, the system disclosed herein 300 includes a signal receiving unit 302 in communication with at least one antenna 304 and configured to receive a transmission including data streams from a plurality of signal sources, and a signal processing unit 306 that performs computations indicated in FIG. 2.

The controller 306 is an instruction execution machine, apparatus, or device and may comprise one or more of a microprocessor, a digital signal processor, a graphics processing unit, an application specific integrated circuit (ASIC), a field programmable gate array (FPGA), and the like. The controller 306 may be configured to execute program instructions stored in a memory and/or data storage (both not shown). The memory may include read only memory (ROM) and random access memory (RAM). The data storage may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVDTM), a BLU-RAY disc; and the like.

The controller 306 and receiver 302 preferably detect and analyze transmissions from a base station ("BS") that operates in a networked environment using logical connections to one or more remote nodes (not shown). The remote node may be another BS, a UE, a computer, a server, a router, a peer device or other common network node. The base station may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000®, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. Other examples of wireless networks include, for example, a BLUETOOTH network, a wireless personal area network, and a wireless 802.11 local area network (LAN).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, a communication interface may include logic configured to support direct memory access (DMA) transfers between memory and other devices.

It should be understood that the arrangement illustrated in FIG. 3 is but one possible implementation, and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 300. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter disclosed, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

We claim:

1. A method of modeling a plurality of data streams from a plurality of signal sources included in a received transmission, the method comprising:
   receiving a transmission including a plurality of data streams from a plurality of signal sources, each data stream including unknown data symbols;
   estimating data symbols for a data stream that cannot be accurately decoded to provide an estimated data stream;
   calculating a residual error for the estimated data stream;
   modeling a residual data stream by removing any decoded data streams from the received transmission; and
   equalizing the modeled residual data stream based on the residual error.

2. The method of claim 1 wherein modeling a residual data stream includes subtracting other estimated data streams from the received transmission.

3. The method of claim 1, comprising decoding data symbols for any of the data streams that can be accurately decoded.

4. The method of claim 1, comprising repeatedly performing the estimating, calculating, modeling, and equalizing until a loop termination requirement is met.

5. The method of claim 4, comprising decoding data symbols for any of the data streams that can be accurately decoded and wherein the loop termination requirement is met when all of the data streams have been decoded or modeled.

6. The method of claim 4, comprising decoding data symbols for any of the data streams that can be accurately decoded and wherein the loop termination requirement is met when either all of the data streams have been decoded or modeled or when a specified number of loops have been completed.

7. The method of claim 1, wherein calculating a residual error of the estimated data stream includes calculating a residual error for each symbol of the estimated data streams.

8. The method of claim 1, wherein calculating a residual error of the estimated data stream includes calculating an average residual error for each of a plurality of sets of data symbols in the estimated data stream.

9. The method of claim 1, wherein calculating a residual error of the estimated data stream includes calculating an average residual error for all of the symbols in the estimated data stream.

10. The method of claim 1, wherein modeling a residual data stream includes weighting the modeled data stream according to its corresponding calculated residual error.

11. The method of claim 4, comprising determining a residual covariance matrix of channel estimates is in each loop from known symbols in the received transmission by subtracting contributions of decoded and modeled data streams.

12. The method of claim 1 wherein the method is applied to each of a plurality of transmissions received on a plurality of frequency carriers in a multicarrier system.

13. The method of claim 12, wherein the multicarrier system is an LTE system.

14. A system for modeling a plurality of data streams, the system comprising:
a signal processing unit including memory, a processor, and an equalizer, and configured to:
estimate data symbols for data streams that cannot be accurately decoded to provide an estimated data stream from among a plurality of data streams from a plurality of signal sources included in a received transmission, each data stream including a plurality of unknown data symbols;
calculate a residual error for the estimated data stream;
model a residual data stream by removing any decoded data streams from the received transmission; and
equalize the modeled residual data stream based on the residual error.

15. The system of claim 14 wherein the signal processing unit is configured to model a residual data stream by subtracting other estimated data streams from the received transmission.

16. The system of claim 14, wherein the signal processing unit is configured to decode data symbols for any of the data streams that can be accurately decoded.

17. The method of claim 14, wherein the signal processing unit is configured to repeatedly perform the estimating, calculating, modeling, and equalizing until a loop termination requirement is met.

18. The system of claim 10, wherein the loop termination requirement is met when all of the data streams have been decoded or modeled.

19. The system of claim 10, wherein the loop termination requirement is met when either all of the data streams have been decoded or modeled, or when a specified number of loops have been completed.

20. The system of claim 14, wherein the signal processing unit is configured to calculate a residual error for each symbol of the estimated data streams.

21. The system of claim 14, wherein the signal processing unit is configured to calculate an average residual error for each of a plurality of sets of data symbols in each data stream.

22. The system of claim 14, wherein the signal processing unit is configured to calculate an average residual error for all of the symbols in each data stream.

23. The system of claim 14, wherein the signal processing unit is configured to weight each of the modeled data streams according to its corresponding calculated residual error.

24. The system of claim 10, wherein the signal processing unit is configured to determine a residual covariance matrix of channel estimates is in each loop from known symbols in the received transmission by subtracting contributions of decoded and modeled data streams.

25. The system of claim 14 wherein the system is applied to each of a plurality of transmissions received on a plurality of frequency carriers in a multicarrier system.

26. The system of claim 25, wherein the multicarrier system is an LTE system.

27. A non-transitory computer readable medium storing a computer program, executable by a machine, for modeling a plurality of data streams, the computer program comprising executable instructions for:
receiving a transmission including a plurality of data streams from a plurality of signal sources, each data stream including unknown data symbols;
estimating data symbols for a data stream that cannot be accurately decoded to provide an estimated data stream;
calculating a residual error for the estimated data stream;
modeling a residual data stream by removing any decoded data streams from the received transmission; and
equalizing the modeled residual data stream based on the residual error.

* * * * *